(12) United States Patent
Miyajima

(10) Patent No.: US 8,633,626 B2
(45) Date of Patent: Jan. 21, 2014

(54) DC MOTOR

(75) Inventor: Yusuke Miyajima, Chiba (JP)

(73) Assignee: Mabuchi Motor Co. Ltd., Chiba (JP)

( * ) Notice: Subject to any disclaimer, the term of this patent is extended or adjusted under 35 U.S.C. 154(b) by 304 days.

(21) Appl. No.: 13/234,477

(22) Filed: Sep. 16, 2011

(65) Prior Publication Data

US 2012/0068566 A1  Mar. 22, 2012

(30) Foreign Application Priority Data

Sep. 17, 2010  (JP) ................................. 2010-209840

(51) Int. Cl.
*H02K 1/17*  (2006.01)
(52) U.S. Cl.
USPC ............ 310/154.22; 310/154.24; 310/154.28; 310/154.29
(58) Field of Classification Search
USPC .............. 310/154.22–154.24, 154.28–154.29
See application file for complete search history.

(56) References Cited

U.S. PATENT DOCUMENTS

| | | | |
|---|---|---|---|
| 6,060,799 A * | 5/2000 | McManus et al. ............... 310/43 |
| 6,218,760 B1 * | 4/2001 | Sakuragi et al. ....... 310/216.111 |
| 6,917,132 B2 * | 7/2005 | Honkura et al. ......... 310/154.22 |
| 6,995,488 B1 * | 2/2006 | Yamashita et al. ....... 310/154.21 |
| 7,064,468 B2 * | 6/2006 | Fujinaka ................ 310/216.114 |
| 2004/0245887 A1 * | 12/2004 | Fujinaka ....................... 310/254 |
| 2008/0124235 A1 * | 5/2008 | Honkura et al. ......... 417/423.14 |
| 2009/0127958 A1 * | 5/2009 | Honkura et al. ......... 310/154.28 |

FOREIGN PATENT DOCUMENTS

| JP | 2009-165213 | 7/2009 |
|---|---|---|
| WO | 2008/126834 A1 | 10/2008 |

* cited by examiner

*Primary Examiner* — Tran Nguyen

(74) *Attorney, Agent, or Firm* — Schwabe, Williamson & Wyatt, P.C.

(57) ABSTRACT

A DC motor comprises: a tubular metal case; a magnet that is provided along the inner surface of the metal case and has four or more of magnet poles in the circumferential direction; an armature that is arranged to face the magnet and composed of a core and a coil; and a shaft. The magnet is formed of a material with a maximum energy product BHmax of 3 to 6 MGOe. When the thickness of the magnet in the radial direction of the armature is indicated by T [mm] and the outer diameter of the core is indicated by d [mm], the ratio T/d of the thickness T of the magnet to the outer diameter d of the core is 0.16 or more.

16 Claims, 8 Drawing Sheets

DC MOTOR

CROSS-REFERENCE TO RELATED APPLICATIONS

This application is based upon and claims the benefit of priority from the prior Japanese Patent Application No. 2010-209840, filed on Sep. 17, 2010, the entire content of which is incorporated herein by reference.

BACKGROUND OF THE INVENTION

1. Field of the Invention

The present invention relates to a DC motor, in particular to a motor used in an electrical power tool, etc.

2. Description of the Related Art

The motors used in electrical power tools, etc., are required to have various properties, such as high output, high torque, compactness, lightweight, and low power consumption, etc. In such a field for power electrical tools, a direct-current motor having a 4-pole field magnet has been devised (see, for example, International Patent Publication WO 08/126,834 and Japanese Patent Application Publication No. 2009-165213). Also, in the field for electrical power tools, there has been an increasing demand for a reduction in the total length of a motor in recent years.

When the total length of a motor is intended to be reduced while the performance of the motor is being maintained, the volume of a magnet is made to be reduced if the diameter of the motor is not changed. Accordingly, it is needed to adopt a magnet with high magnet force, such as a rare-earth magnet, in order to generate necessary magnetic field by a magnet having a smaller volume. In this case, a reduction in the cost of the motor cannot be achieved because the magnet with high magnetic force is expensive. Therefore, the present inventor is trying to adopt a low-cost magnet in a motor whose total length is reduced while whose performance necessary for electrical power tools is being maintained.

However, the life of such a motor sometimes becomes shorter than expected. For example, when a ferrite magnet is adopted in view of cost, the magnetic field generated by the magnet with a reduced volume becomes weak, and hence it is needed to enhance the magnetic field generated by an armature (rotor) when the performance of the motor is maintained. In this case, because the strength of the magnetic field generated by the magnet becomes relatively weaker than that of the magnetic field generated by the armature, an influence by a so-called armature reaction becomes large. It is believed that the life of the motor has become shorter than expected as a result of that.

SUMMARY OF THE INVENTION

The present invention has been made in view of these situations, and a purpose of the invention is to provide a DC motor in which a reduction in the total length of which and long life of which have been both achieved.

In order to solve the aforementioned problem, a DC motor according to an embodiment of the present invention comprises: a yoke; a magnet that is provided along the inner surface of the yoke and has four or more of magnet poles in the circumferential direction; an armature that is arranged to face the magnet and composed of a core and a coil; a shaft that is fixed by being inserted along the rotating shaft of the armature; and a commutator that is attached to the shaft so as to be coaxial with the armature. The magnet is formed of a material with a maximum energy product BHmax of 3 to 6 MGOe. When the thickness of the magnet in the radial direction of the armature is indicated by T [mm] and the outer diameter of the core is indicated by d [mm], the ratio T/d of the thickness T of the magnet to the outer diameter d of the core is 0.16 or more. Herein, it can be said that, when a yoke has, for example, a cylindrical shape, the outer diameter of the yoke means the diameter thereof. Alternatively, it can be said that, when the yoke does not have a cylindrical shape, the outer diameter of the yoke means the width thereof in the direction in which magnetic poles facing each other by sandwiching the central axis of the yoke between them are connected together.

According to the embodiment, even when a relatively inexpensive magnet with a maximum energy product of approximately 3 to approximately 6 MGOe is used, a reduction in the total length of a motor and long life of the motor can be both achieved while the desired motor performance is being maintained. Specifically, by making the ratio T/d of the thickness T of a magnet to the outer diameter d of a core to be 1.6 or more, the volume of the magnet can be increased to some extent, thereby allowing an influence by a so-called armature reaction to be alleviated. That is, an electrical lagging phase (an angle of lag) during the load rotation of a motor becomes small and the sparks generated between a commutator and a brush, occurring due to the angle of lag, is suppressed, and hence long life of the brush and furthermore long life of the motor can be achieved.

In particular, when the thickness of the core in the rotating shaft direction of the armature is indicated by L [mm] and the outer diameter of the yoke in the radial direction of the armature is indicated by D [mm], and when the ratio L/D of the thickness L of the core to the outer diameter D of the yoke is made to be less than 0.60, the strength of the magnetic field generated in a rotor becomes stronger than that of the magnetic field generated in a magnet. As a result, the generation of sparks is accelerated with an influence by an armature reaction being enhanced, thereby causing the life of a motor to be remarkably shortened. The aforementioned structure in which the ratio T/d of the thickness T of a magnet to the outer diameter d of a core is made to be 0.16 or more has a particularly high effect of achieving long life of a motor, when the motor has a structure in which the ratio L/D of the thickness L of the core to the outer diameter D of a yoke is made to be less than 0.60.

The shaft is supported by a bearing at each of both sides between which the armature and the commutator are sandwiched, and the space between the two bearings may be 35 to 70 [mm]. The space between them is preferably 60 [mm] or less, and more preferably 55 [mm] or less. Thereby, the total length of an electrical power tool using such a motor can also be reduced.

The core may have an outer diameter d of 20 to 35 [mm]. As stated above, a reduction in the total length of a motor and long life of the motor can be both achieved while the motor performance required for electrical power tools, etc., is being satisfied.

The yoke may be an annular housing and the housing may have an outer diameter D of 30 to 55 [mm]. Thereby, the total length of a motor can be reduced while the desired motor properties are being maintained, even when the motor is small in size to some extent.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

Figure 1:
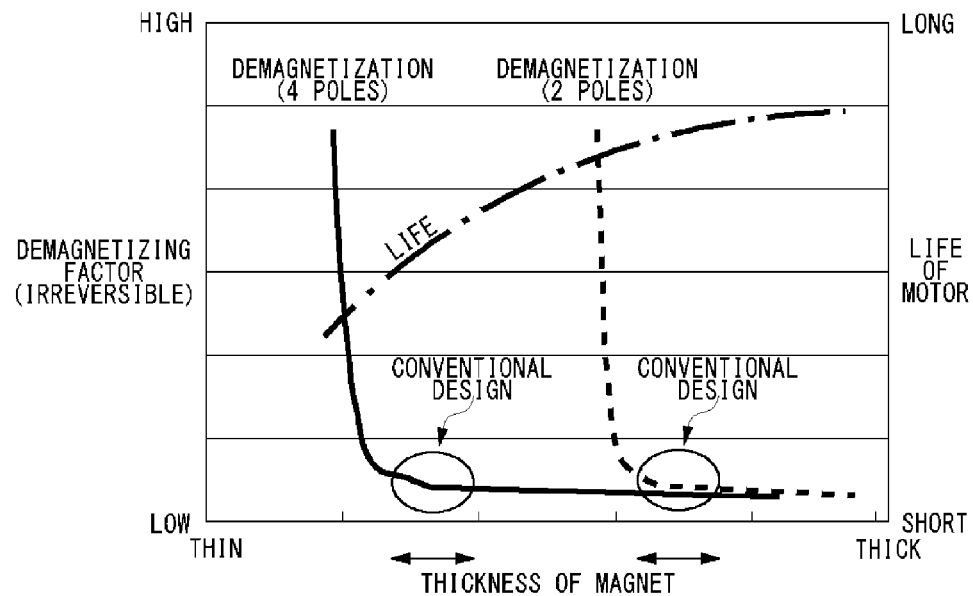
FIG. 1 is a graph illustrating tendencies between a demagnetizing factor and the thickness of a magnet and between the life of a motor (brush) and the thickness of the magnet.

The invention will now be described by reference to the preferred embodiments. This does not intend to limit the scope of the present invention, but to exemplify the invention.

Hereinafter, embodiments of the present invention will de described with reference to the accompanying drawings. In the description of the drawings, like elements will be denoted with like reference numerals and duplicative description will be appropriately omitted. In addition, the configurations described below are intended only to exemplify the invention, but not to limit the scope of the invention at all.

The process in which the performance of a motor according to the present embodiments will be described. FIG. 1 is a graph illustrating tendencies between a demagnetizing factor and the thickness of a magnet and between the life of a motor (brush) and the thickness of the magnet. In a usual magnet, a thickness within a range where irreversible demagnetization does not occur is secured such that the performance necessary as a motor is exhibited, while the thickness thereof is made to be small as much as possible in view of a reduction in material cost. That is, the thickness of a conventional magnet is set to be within the area range indicated by the arrow, as illustrated in FIG. 1. More specifically, the thickness thereof is set to a value slightly larger than the thickness of a magnet in which a demagnetizing factor is drastically increased. In addition, in a motor using a 4-pole magnet, the strength of an armature demagnetizing field is dispersed in comparison with a motor using a 2-pole magnet that has been designed to exhibit the same motor performance, and hence it becomes difficult that irreversible demagnetization may occur, thereby allowing the thickness of the magnet to be made small. On the other hand, there is the tendency that the life of a motor is shortened as the thickness of a magnet becomes smaller.

Figure 2:
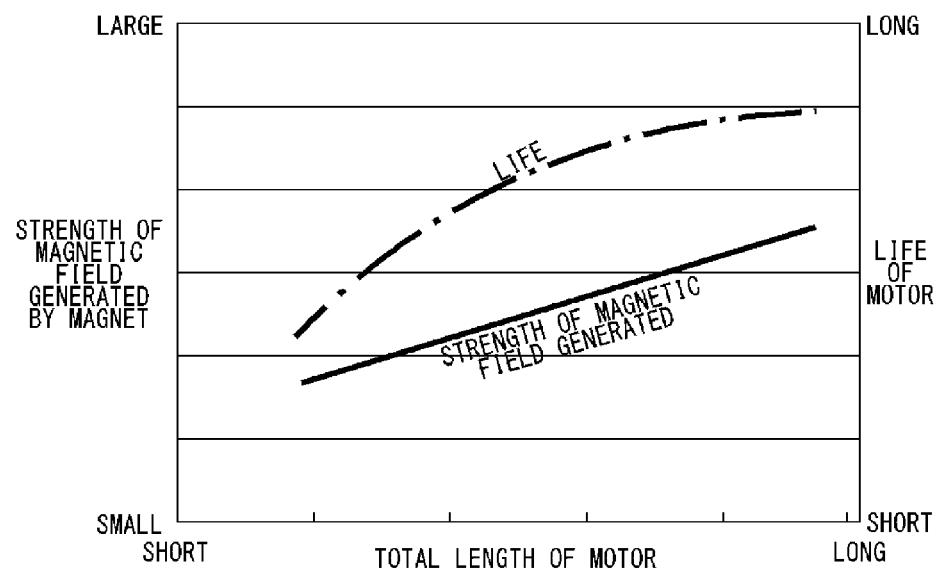
FIG. 2 is a graph illustrating tendencies between the strength of a magnetic field generated by a magnet and the total length of a motor and between the life of the motor (brush) and the total length of the motor.

FIG. 2 is a graph illustrating tendencies between the strength of a magnetic field generated by a magnet and the total length of a motor and between the life of the motor (brush) and the total length of the motor. The volume of a magnet tends to be decreased as the total length of a motor is reduced, and the strength of a magnetic field generated by the magnet becomes small. Accordingly, an influence by a so-called armature reaction becomes large, and wear of a brush is likely to be accelerated by the generation of sparks during commutation.

The aforementioned armature reaction means a phenomenon in which, if the magnetic flux generated by a magnet and the magnetic flux generated by an armature current occurring when a load current flows are synthesized, a bias is generated in the direction of the synthesized magnetic flux. For example, even if a magnet and an armature have been assembled to geometrically have a neutral phase during the manufacture of a motor, an electrical lagging phase (an angle of lag) is generated due to an armature reaction during load rotation. Accordingly, an influence by an armature reaction becomes larger as the ratio of the strength of the magnetic field generated by a magnet to that of the magnetic field generated by an armature during load rotation is smaller. That is, there is the tendency that, as the strength of the magnetic field generated by a magnet is smaller, the sparks during commutation are increased, thereby causing the life of a motor to be shortened.

The present inventor has devised a motor based on such knowledge in which, in a motor using a low-cost magnet with four or more of magnetic poles, a reduction in the total length of the motor and long life thereof are both achieved.

(First Embodiment)

Figure 3:
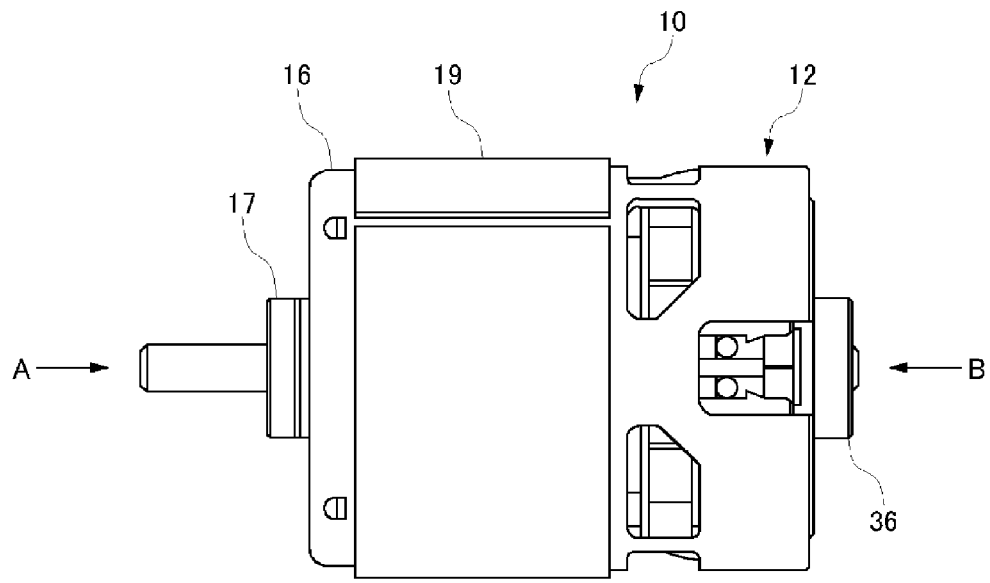
FIG. 3 is a front view of a DC motor according to a first embodiment.
Figure 4:
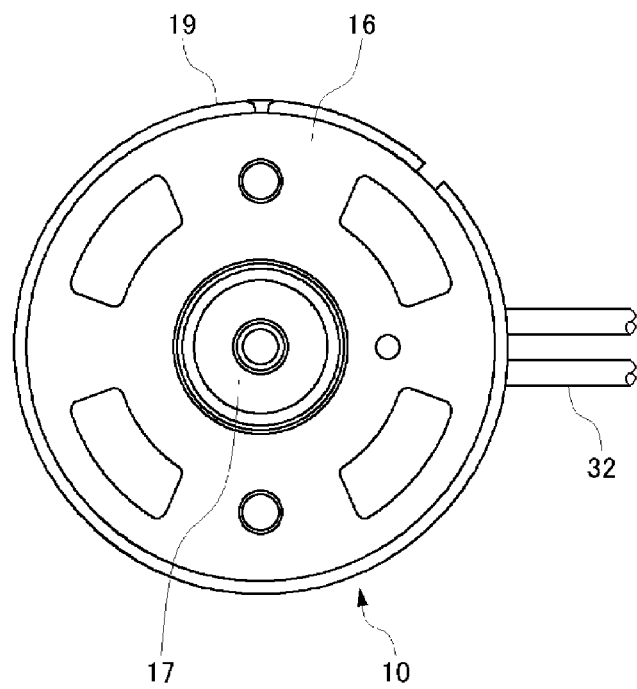
FIG. 4 is a side view of the DC motor, viewed from A direction in FIG. 3.
Figure 5:
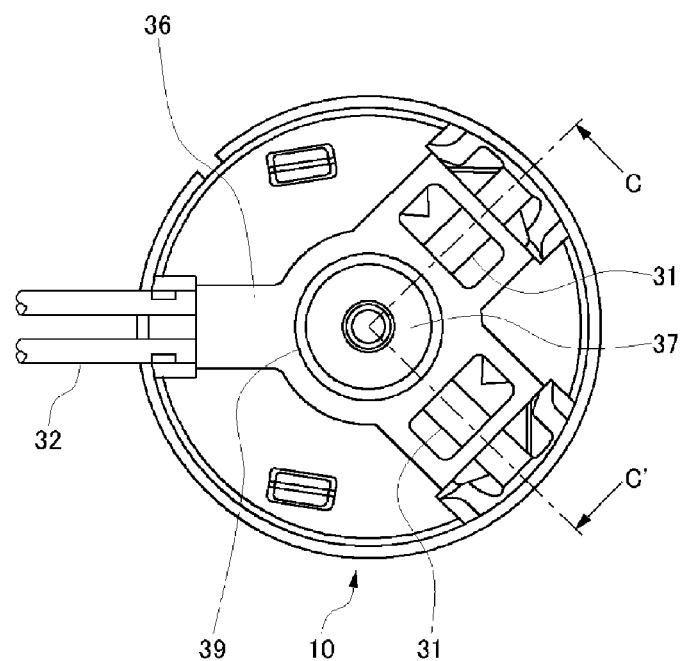
FIG. 5 is a side view of the DC motor, viewed from B direction in FIG. 3.
Figure 6:
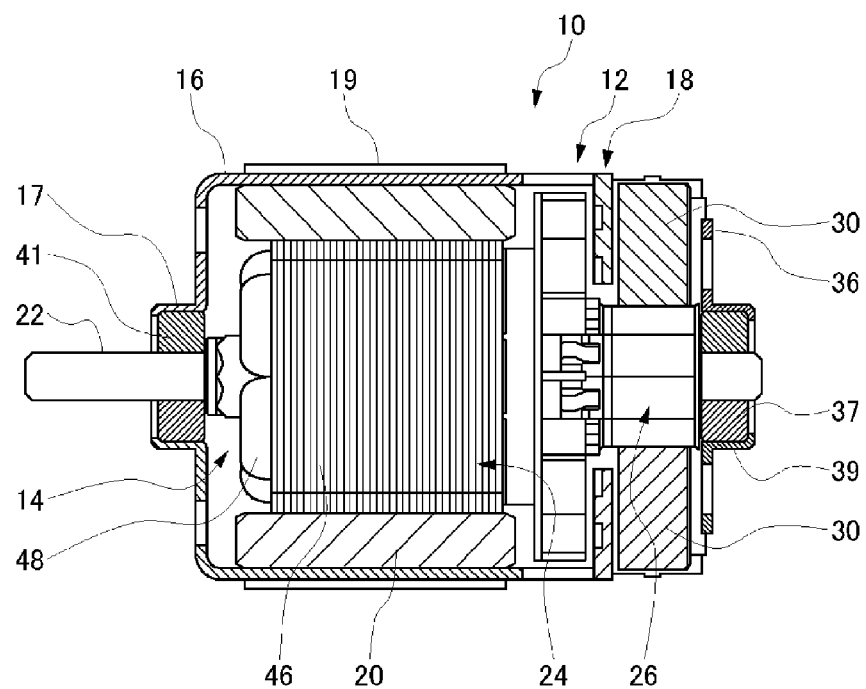
FIG. 6 is a sectional view, taken along line C-C' in FIG. 5.

FIG. 3 is a front view of a DC motor according to a first embodiment. FIG. 4 is a side view of the DC motor, viewed from A direction in FIG. 3. FIG. 5 is a side view of the DC motor, viewed from B direction in FIG. 3. FIG. 6 is a sectional view, taken along line C-C' in FIG. 5.

As illustrated in FIGS. 3 to 5, a DC motor (simply referred to as a "motor") 10 is formed by housing a rotor 14 in a cylindrical housing 12. The housing 12 is formed by installing a bottomed tubular metal case 16, which also functions as a yoke, and a cylindrical brush holder 18 made of a resin. An annular auxiliary yoke 19 is fixed to the outer circumference of the metal case 16. The auxiliary yoke 19 is a steel plate for being wound around the metal case 16 in order to reduce a leak magnetic flux from the housing 12.

The metal case 16 and the auxiliary yoke 19 also function as a yoke for forming a magnetic circuit, and a tubular field magnet (simply referred to as a "magnet") 20 is fixed to the inner circumferential surface of the metal case 16, thereby both the metal case 16 and the auxiliary yoke 19 forming a stator. A boss portion 17 is formed at the center of the bottom of the metal case 16 so as to slightly protrude outward, so that the later-described bearing is housed therein.

The rotor 14 is formed by providing an armature 24 and a commutator 26, etc., onto a shaft 22 that serves as a rotating shaft. The shaft 22 is inserted along the shaft line of the housing 12 and also inserted along the rotating shaft of the armature 24 so as to be fixed with respect to the armature 24. The armature 24 is arranged to face the magnet 20. A pair of carbon brushes 30, which are arranged to face the commutator 26, are provided in the brush holder 18. A lead wire 32 for connecting with a non-illustrated electrical component is attached to the brush holder 18 in series with the carbon brushes 30.

The brush holder 18 is installed by being inserting into the metal case 16 in a state of a brush holder assembly to which the lead wire 32 has been attached. After being installed as stated above, the brush holder assembly is fixed to the opening of the metal case 16. The brush holder 18 having an outer shape approximately the same as that of the opening of the metal case 16 is inserted and fitted into the opening. An end plate 36 is fixed to the metal case 16 so as to cover a carbon holder 31 provided in the brush holder 18 and the lead wire 32.

A boss portion 39 is formed at the center of the end plate 36 so as to slightly protrude outward, so that a ring-shaped sliding bearing 37 made of a so-called oil-less metal is press-fitted therein, the sliding bearing 37 being impregnated with the oil for lubrication. An insertion hole is provided concentrically with the sliding bearing 37 on the bottom of the boss portion 39. One end of the shaft 22 penetrates the insertion hole to be externally exposed. Although the sliding bearing 37 may be provided in the brush holder 18, not in the end plate 36, the configuration according to the present embodiment in which the sliding bearing 37 is held by the end plate 36 made of metal is resistant to a change in temperature and humidity in comparison with the case where the sliding bearing 37 is held by the brush holder 18 made of a resin, and accordingly the expansion and contraction of the volume of a motor, occurring due to a change in the temperature and humidity environment under which the motor is used, is small. Thereby, it becomes possible to improve the coaxial degree of the shaft 22 and to maintain a high-accurate and stable rotating state of the rotor 14.

As illustrated in FIG. 6, the internal space of the housing 12 is formed so as to be surrounded by the metal case 16 and the brush holder 18. On the other hand, a sliding bearing 41 is also press-fitted into the boss portion 17 in the metal case 16. The sliding bearing 41 penetrates the end portion of the shaft 22 in order to rotatably support the shaft 22. An opening is formed at the center of the boss portion 17 such that one end of the shaft 22 protrudes therefrom.

The armature 24 is formed by including a core 46 press-fitted onto the shaft 22 and a coil 48 wound around the core 46. The outer circumferential surface of the core 46 is arranged to face, with a predetermined clearance (magnetic gap), the inner circumferential surface of the magnet 20. The configuration of the magnetic pole formed by these magnet 20 and core 46 will be described in detail later.

The commutator 26 having a cylindrical shape is press-fitted onto the shaft 22 at a position where the commutator 26 is arranged to face the carbon brush 30 when the brush holder 18 has been installed in the metal case 16, and is attached to the shaft 22 so as to be coaxial with the armature 24. The tubular carbon holder 31 (see FIG. 5) is fixed to the brush holder 18, and the carbon brush 30 is supported by being inserted into the carbon holder 31. The carbon brush 30 is positioned so as to be brought into sliding contact with the outer circumferential surface of the commutator 26 in this state.

Figure 7:
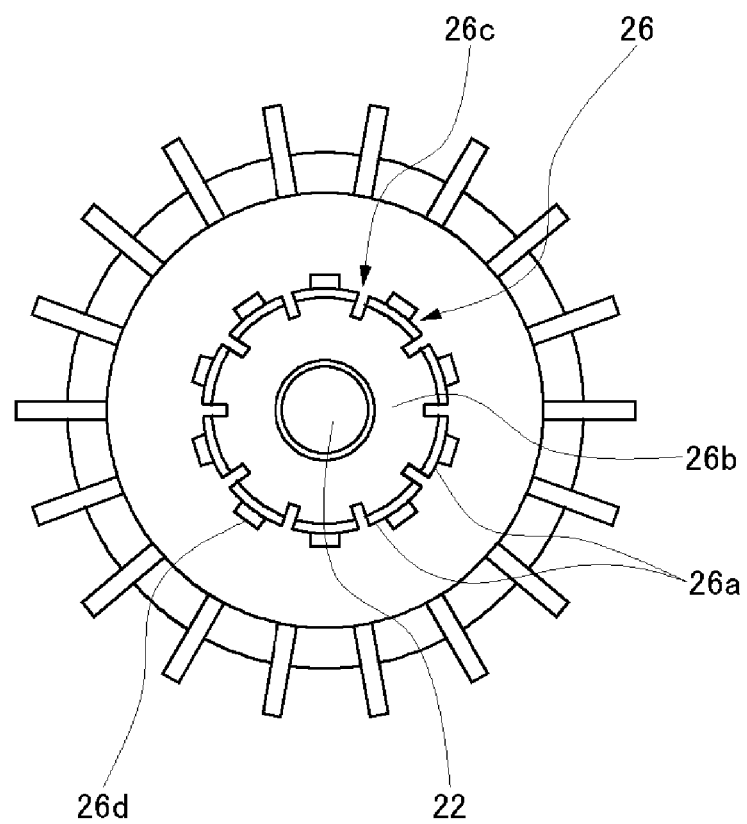
FIG. 7 is a top view of a rotor in which a coil is not illustrated.

FIG. 7 is a top view of the rotor 14 in which a coil is not illustrated. The commutator 26 has ten commutator segments 26a. Each of the commutator segments 26a formed of a conductive material is separated from other commutator segments with slits 26c on the circumference of a commutator core 26b formed of an insulating material, and a wire connecting portion 26d is formed by bending the ends of the commutator segment 26a.

Figure 8:
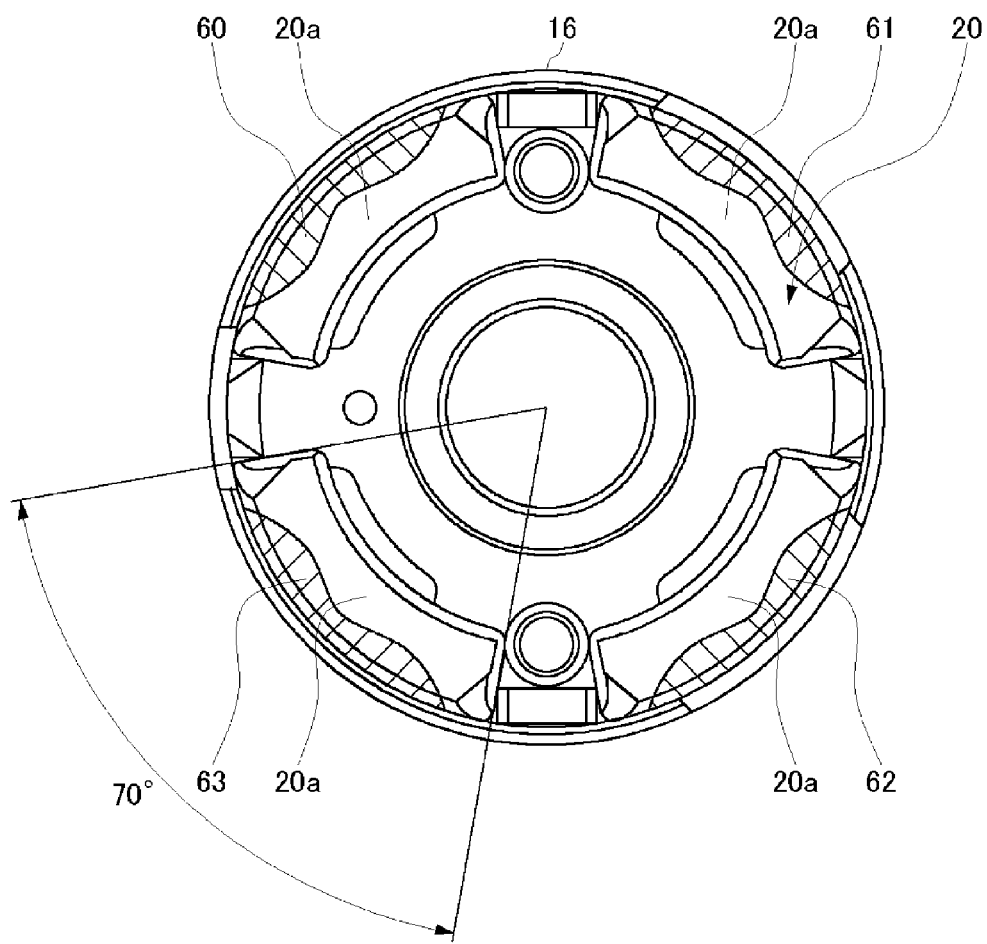
FIG. 8 is a side view in which a metal case, inside of which a magnet is fixed, is viewed from the side of the opening thereof.
Figure 9:
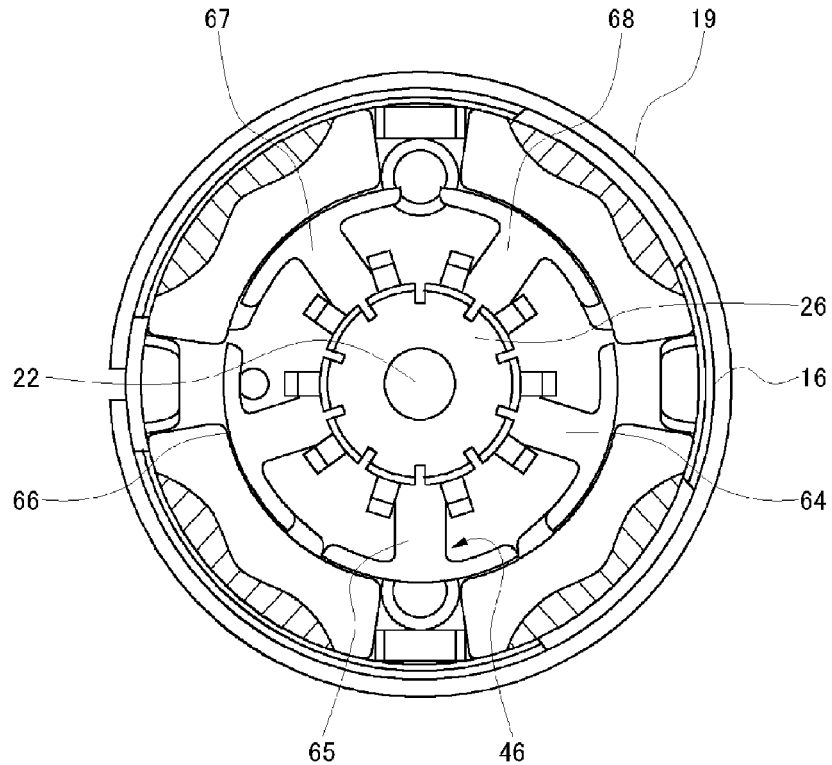
FIG. 9 is a side view in which the metal case, inside of which the magnet is fixed and an armature is housed, is viewed from the side of the opening thereof.

FIG. 8 is a side view in which the metal case 16, inside of which the magnet 20 is fixed, is viewed from the side of the opening of the case 16. FIG. 9 is a side view in which the metal case 16, inside of which the magnet 20 is fixed and the armature 24 is housed, is viewed from the side of the opening of the case 16. In FIG. 8, for description of the magnet poles of the magnet 20, other parts are not illustrated. FIG. 9 illustrates a state in which the armature has been inserted into the metal case and the coil is not illustrated.

The outer circumferential surface of the magnet 20 is firmly fixed to the inner circumferential surface of the metal case 16 via adhesive. The magnet 20 is formed with four arc-shaped members 20a, each of which is arranged at a predetermined position so as to define a circumferential clearance with the adjacent member 20a. The magnet 20 is formed such that the center of a virtual circle formed by the inner circumferential surfaces of the four arc-shaped members 20a matches the shaft center of the armature 24, and each magnetic pole is formed in each member 20a. That is, the magnet 20 is formed with a tubular body of a 4-pole field magnet, in which a magnetic pole 60 (N pole), a magnetic pole 61 (S pole), a magnetic pole 62 (N pole), and a magnetic pole 63 (S pole) are provided at circumferentially equal intervals. Although the magnet 20 can be formed by fixing it to the metal case 16 and then by magnetizing from the outside of the metal case 16 with a magnetic field generator, a technique for magnetizing it is publicly known, and hence detailed description thereof will be omitted. Alternatively, the magnet 20 may be formed of an annular single member.

The magnet 20 according to the present embodiment is formed of a material with a maximum energy product BHmax of 3 to 6 MGOe (23.9 to 47.8 kJ/m$^3$). Examples of such a material include a sintered body of ferrite, a mixture in which ferrite is dispersed in a plastic, and a mixture in which multiple types of magnetic materials are dispersed in a plastic. A magnet with the aforementioned maximum energy product can be made of a low-cost material.

On the other hand, the core 46 has five magnetic poles 64 to 68 extending radially from a central cylinder portion press-fitted onto the shaft 22, around each of which a coil is wound, as illustrated in FIG. 9. Coating powders for insulation are applied between the core 46 and the coil.

In the aforementioned motor 10, a configuration has been subsequently studied in which the life of the motor is extended while the total length thereof is being reduced. Specifically, parameters, such as the thickness T [mm] of the magnet in the radial direction of the armature 24, the outer diameter d [mm] of the core, the thickness L [mm] of the core in the rotating shaft direction of the armature, and the outer diameter D [mm] of a metallic member in the radial direction of the armature, have been taken into consideration. The reason why these parameters have been taken into consideration will be described below.

As illustrated in FIGS. 1 and 2, it is suggested that the life of a motor may be extended by enhancing the strength of the magnetic field generated by a magnet. On the other hand, the total length of a magnet is limited when a motor is intended to be reduced in length. In addition to that, use of a material for enhancing the performance of a magnet itself, for example, a rare-earth magnet, is limited in view of cost. Accordingly, as a result of intensive studies by the present inventor, the configuration that the life of a motor may be extended by optimizing the aforementioned parameters while the total length of the motor is being reduced has been conceived of.

Figure 10:
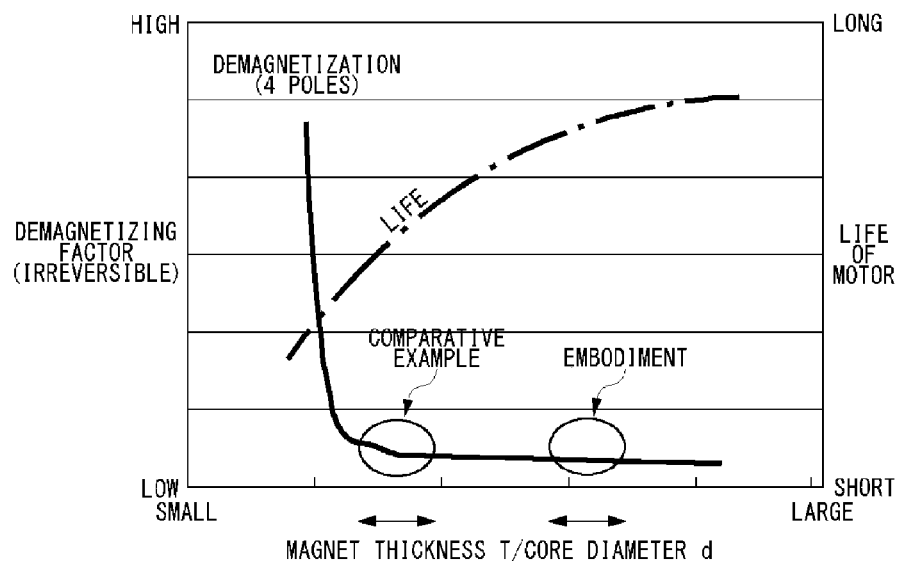
FIG. 10 is a graph illustrating tendencies between a demagnetizing factor and the ratio of the thickness T of a magnet to the outer diameter d of a core and between the life of a motor and the above ratio.
Figure 11:
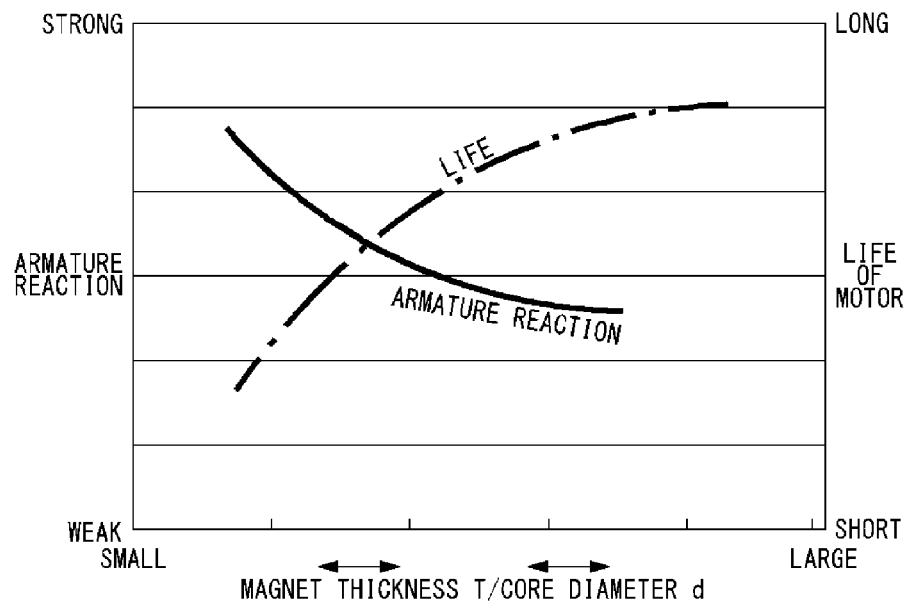
FIG. 11 is a graph illustrating tendencies between an influence by an armature reaction and the ratio of the thickness T of a magnet to the outer diameter d of a core and between the life of a motor and the above ratio.
Figure 12:
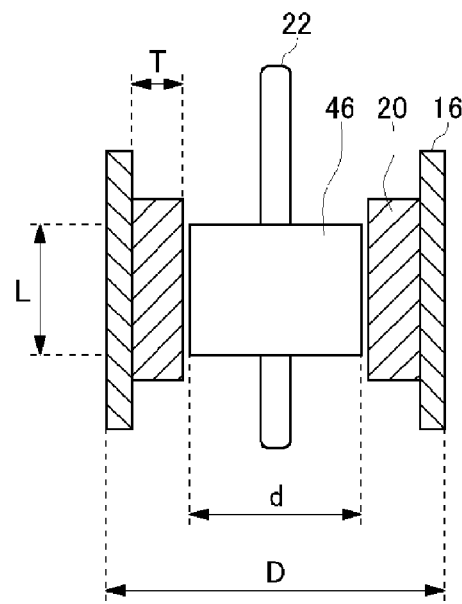
FIG. 12 is a schematic view illustrating the essential portions for describing each parameter.

In order to extend the life, it is needed to suppress an influence by an armature demagnetizing field, and it is effective to make the magnetic field generated by a magnet to be relatively stronger than that generated by the rotor 14. Accordingly, the ratio of the thickness T of a magnet to the outer diameter d of a core has been taken into consideration. FIG. 10 is a graph illustrating tendencies between a demagnetizing factor and the ratio of the thickness T of a magnet to the outer diameter d of a core and between the life of a motor and the above ratio. FIG. 11 is a graph illustrating tendencies between an influence by an armature reaction and the ratio of the thickness T of a magnet to the outer diameter d of a core and between the life of a motor and the above ratio. FIG. 12 is a schematic view illustrating the essential portions for describing each parameter.

As illustrated in FIGS. 10 and 11, the motor 10 according to the present embodiment adopts a configuration in which the value of T/d is made larger than before. That is, by making the thickness T of the magnet 20 to be large and the outer diameter d of the core 46 to be small, an influence by an armature reaction is alleviated, thereby allowing long life of the motor to be achieved. It is preferable that the thickness T of the magnet 20 according to the embodiment is approximately 4.6 to 6 [mm]. If the thickness T of a magnet is less than 4.6 mm, it is not possible to generate a magnetic field with the strength by which an influence by an armature reaction can be sufficiently alleviated. If the thickness T of a magnet is more than 6.0 [mm], the motor itself becomes large in size. The outer diameter d of the core 46 is 20 to 35 [mm].

As a means for making the strength of the magnetic field generated by the armature 24 to be small, it can also be taken into consideration to make the thickness L of the core 46 to be small. In the present embodiment, the thickness L of the core 46 is 10 to 30 [mm]. On the other hand, the outer diameters D of the housing and yoke are determined to some extent, depending on an application. The present embodiment adopts a configuration in which the value of L/D is relatively smaller than before for electrical power tools. Specifically, a motor having the value of L/D less than 0.60 is assumed. That is, the motor according to the embodiment has a shape in which the total length thereof is relatively small with respect to the diameter thereof.

Further, the motor 10 according to the present embodiment has the outer diameter D of the metal case 16 (or the auxiliary yoke 19) of 30 to 55 [mm]. Thereby, the total length of the motor can be reduced while the desired motor properties are being maintained, even when the motor is small in size to some extent. Further, the motor 10 has the space between the two sliding bearings 37 and 41 (hereinafter, appropriately referred to as the "total length") of 35 to 70 [mm]. Thereby, the total length of an electrical power tool using such a motor can also be reduced.

Hereinafter, descriptions will be made with respect to the configuration of each of comparative examples and examples, and to the life tests in the configuration. In a motor having any one of the configurations, a performance is achieved in which stalling torque is approximately 100 to 1500 [mN*m], which is preferable for electrical power tools.

[Life Test Conditions]
voltage: 18.0 V+0.11Ω
Load: current of 15 A loaded
Test Mode: continuous
Rotating Speed during Test: approximately 17000 rpm
Brush Wear Speed: brush wear amount per 100 hours worked
Brush Material: carbon brush

COMPARATIVE EXAMPLE 1

The motor according to Comparative Example 1 has the total length of 67.0 [mm], the outer diameter of a housing of 47.0 [mm], the thickness L of a core of 31.0 [mm], the outer diameter d of the core of 27.5 [mm], and the thickness T of a magnet of 5.7 [mm]. In this case, it is satisfied that T/d=0.21 and L/D=0.66. A 2-pole ferrite magnet is used for the magnet. Although the motor with this configuration has a brush wear speed of approximately 1.1 mm/100 h and is sufficiently durable for practical use, L/D is as large as 0.66, and accordingly the total length has not been reduced.

COMPARATIVE EXAMPLE 2

The motor according to Comparative Example 2 has the total length of 50.0 [mm], the outer diameter of a housing of 45.0 [mm], the thickness L of a core of 17.2 [mm], the outer diameter d of the core of 30.0 [mm], and the thickness T of a magnet of 4.5 [mm]. In this case, it is satisfied that T/d=0.15 and L/D=0.38. A 4-pole ferrite magnet is used for the magnet. Although L/D is small and the total length has been reduced in the motor, T/d is as small as 0.15 and an influence by an armature reaction is large. Accordingly, a brush wear speed in the motor with this configuration is approximately 5.0 mm/100 h, thereby causing the life of the motor to be remarkably shortened.

EXAMPLE

Subsequently, Example will be described. The motor 10 according to Example has the total length of 53.5 [mm], the outer diameter of a housing of 45 [mm], the thickness L of a core of 23.5 [mm], the outer diameter of the core of 27.5 [mm], and the thickness T of a magnet of 5.8 [mm]. In this case, it is satisfied that T/d=0.21 and L/D=0.52. The brush wear speed in the motor with this configuration is less than 2.0 mm/100 h, and accordingly the life sufficiently durable for practical use has been achieved. Further, L/D is 0.52 and accordingly the total length of the motor has been sufficiently reduced.

As stated above, in the motor 10 according to the present embodiment, a reduction in the total length of the motor and long life of the motor can be both achieved while the desired motor performance is being maintained, even when a relatively inexpensive magnet with a maximum energy product of 3 to 6 MGOe is used. Specifically, by making the ratio T/d of the thickness T of the magnet to the outer diameter d of a core to be 0.16 or more, the volume of the magnet can be increased to some extent. Thereby, the strength of the magnet field generated by the magnet can be enhanced and an influence by a so-called armature reaction can be alleviated.

That is, an electrical lagging phase (an angle of lag) during the load rotation of the motor becomes small and the sparks generated between a commutator and a brush, occurring due to the angle of lag, is suppressed, and hence long life of the brush, and furthermore long life of the motor can be achieved. On the other hand, by making the ratio L/D of the thickness L of the core to the outer diameter D of a metallic member to be less than 0.60, the length of a rotor in the rotating shaft direction is limited to some extent, and accordingly the strength of the magnetic field generated in the rotor can also be suppressed.

As a result, an influence by an armature reaction is alleviated and the generation of sparks is suppressed as stated above, thereby allowing long life of the motor to be achieved. Further, because the length of the rotor in the rotating shaft direction is limited to some extent, the total length of the motor can also be reduced. As stated above, a reduction in the total length of a motor and long life of the motor can be both achieved while the motor performance required for electrical power tools, etc., is being satisfied.

(Second Embodiment)

Figure 13:
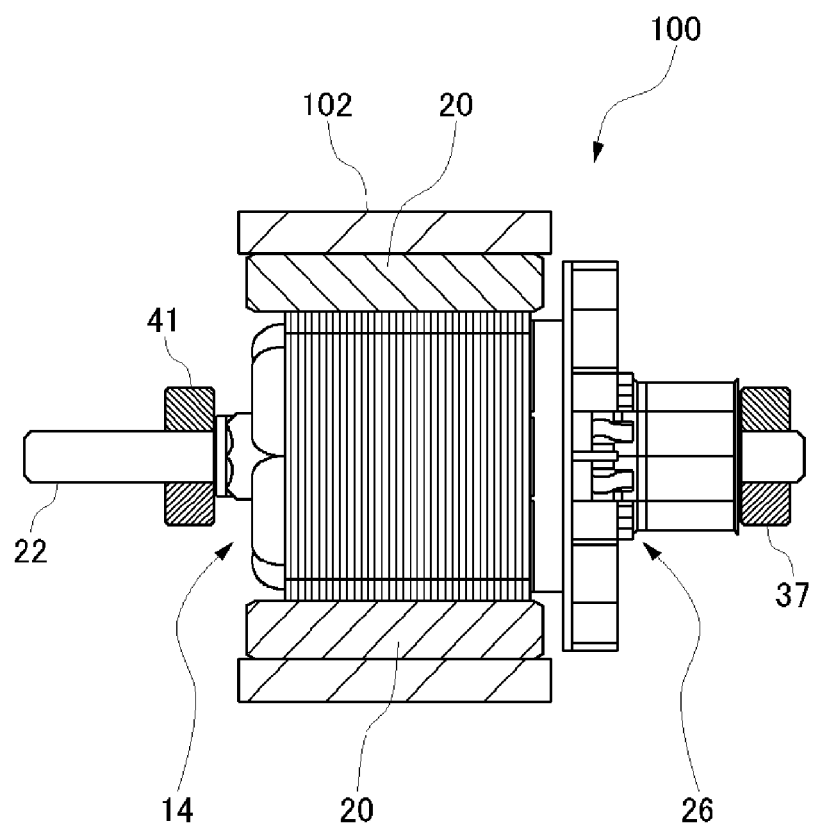
FIG. 13 is a sectional view of a motor according to a second embodiment.

In the motor 10 according to the first embodiment, the magnet 20 and the rotor 14 are integrated with each other by being housed in the housing 12. However, there are sometimes the cases where a housing is not necessarily needed, depending on an application of a motor. In addition, there are sometimes the cases where a brush itself is arranged near to an apparatus to which a motor is to be attached. FIG. 13 is a sectional view of a motor 100 according to a second embodiment. The components similar to the first embodiment will be denoted with the same reference numerals and descriptions thereof will be appropriately omitted.

The motor 100 comprises: an annular yoke 102; a magnet 20 provided near to the inner circumference of the yoke 102; a rotor 14; and a commutator 26, each of which is arranged concentrically, centered on a shaft 22. The motor 100 is attached to an apparatus to be used via the yoke 102 and two sliding bearing 37 and 41. In the motor 100 having such a configuration, the same operational effects as in the motor 10 according to the first embodiment can be obtained.

The present invention should not be limited to the aforementioned each embodiment and example, and various modifications, such as design modifications, can be made with respect to the above embodiments and examples based on the knowledge of those skilled in the art. Such modified embodiments can also fall in the scope of the present invention.

For example, the description has been made in the above embodiments, assuming that the magnet has four magnet poles; however, the magnet may have four or more of magnet poles.

What is claimed is:

1. A DC motor comprising:
    a yoke;
    a magnet that is provided along the inner surface of the yoke and has four or more of magnet poles in the circumferential direction;
    an armature that is arranged to face the magnet and composed of a core and a coil;
    a shaft that is fixed by being inserted along the rotating shaft of the armature; and
    a commutator that is attached to the shaft so as to be coaxial with the armature; wherein
    the magnet is formed of a material with a maximum energy product BHmax of 3 to 6 MGOe, and wherein
    when the thickness of the magnet in the radial direction of the armature is indicated by T [mm] and the outer diameter of the core is indicated by d [mm], the ratio T/d of the thickness T of the magnet to the outer diameter d of the core is 0.16 or more.

2. The DC motor according to claim 1, wherein
when the thickness of the core in the rotating shaft direction of the armature is indicated by L [mm] and the outer diameter of the yoke in the radial direction of the armature is indicated by D [mm], the ratio L/D of the thickness L of the core to the outer diameter D of the yoke is less than 0.60.

3. The DC motor according to claim 1, wherein
the shaft is supported by a bearing at each of both sides between which the armature and the commutator are sandwiched, and wherein
the space between the two bearings is 35 to 70 [mm].

4. The DC motor according to claim 2, wherein
the shaft is supported by a bearing at each of both sides between which the armature and the commutator are sandwiched, and wherein
the space between the two bearings is 35 to 70 [mm].

5. The DC motor according to claim 1, wherein
the core has an outer diameter d of 20 to 35 [mm].

6. The DC motor according to claim 2, wherein
the core has an outer diameter d of 20 to 35 [mm].

7. The DC motor according to claim 3, wherein
the core has an outer diameter d of 20 to 35 [mm].

8. The DC motor according to claim 4, wherein
the core has an outer diameter d of 20 to 35 [mm].

9. The DC motor according to claim 1, wherein
the yoke is an annular housing, and wherein
the housing has an outer diameter D of 30 to 55 [mm].

10. The DC motor according to claim 2, wherein
the yoke is an annular housing, and wherein
the housing has an outer diameter D of 30 to 55 [mm].

11. The DC motor according to claim 3, wherein
the yoke is an annular housing, and wherein
the housing has an outer diameter D of 30 to 55 [mm].

12. The DC motor according to claim 4, wherein
the yoke is an annular housing, and wherein
the housing has an outer diameter D of 30 to 55 [mm].

13. The DC motor according to claim 5, wherein
the yoke is an annular housing, and wherein
the housing has an outer diameter D of 30 to 55 [mm].

14. The DC motor according to claim 6, wherein
the yoke is an annular housing, and wherein
the housing has an outer diameter D of 30 to 55 [mm].

15. The DC motor according to claim 7, wherein
the yoke is an annular housing, and wherein
the housing has an outer diameter D of 30 to 55 [mm].

16. The DC motor according to claim 8, wherein
the yoke is an annular housing, and wherein
the housing has an outer diameter D of 30 to 55 [mm].

* * * * *